United States Patent Office 2,777,939
Patented Jan. 15, 1957

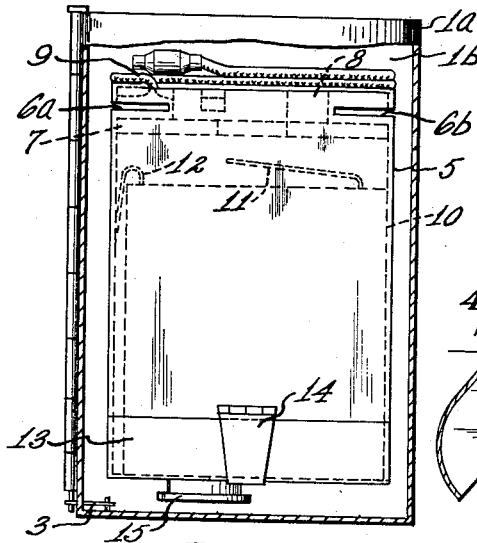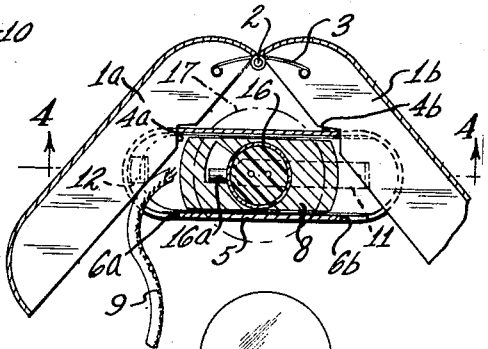

2,777,939

PHOTOGRAPHIC ILLUMINATOR UNIT

Hans Späth, Landshut, Germany, assignor to Agfa Camera-Werk Aktiengesellschaft, Munich, Germany, a corporation of Germany Application June 24, 1952, Serial No. 295,272

Claims priority, application Germany August 14, 1951

2 Claims. (Cl. 240—1.3)

This invention relates to photographic equipment, especially to flash lamp units and reflectors therefor. More particularly, this invention relates to a novel photographic illuminator unit for use with candid or box-type cameras which is more compact and easier to handle and carry than prior type equipment of like nature.

Vacuum flash lamp and reflector units for use with various sized portable cameras are well known, but due to their bulky size and shape are not suitable for carrying in coatpockets or handbags and the like and usually require special carrying cases or containers of expensive construction. These prior illuminating units usually consist of a battery casing having means for attachment to the body of a camera and a parabolic reflector having means for attachment to the battery casing, the casing being provided with a socket for receiving various sized vacuum flash lamps. To render the illuminating unit efficient it has been necessary to design the reflector as a relatively large body compared to the other elements of photographic equipment, and as a consequence it is too large to fit conveniently into conventional sized coatpockets or handbags. It will thus be seen that the elemental parts of the equipment necessary to take "snapshots" under illumination from an associated flash-unit consists of several isolated elements of small (flash lamps and connecting cable), medium (battery casing) and large (camera and reflector) sizes which further complicate the problem of conveniently transporting the equipment without using a special carrying case therefor.

It is therefore a prime object of the instant invention to provide an improved camera illuminating unit which is self-contained and compact so as to be easily carried in conventional sized coatpockets or handbags. Another object of the invention is to provide a novel reflector element of two parts which may be hinged together to fold one side upon the other to provide a compact unit of small size for easy handling but which will be of conventional size when unfolded to function as an illumination reflector. A still further object is to provide a reflector unit which will function in one of its operative configurations to provide a housing for enclosing an associated battery casing, connecting cable and flash lamps. Other and distinct objects will be apparent from the disclosure and claims that follow.

The instant illustrated concept of the invention may be briefly described as consisting of a box-like reflector structure which is adapted to enclose and cover a conventional battery casing, and if desired, the associated electrical connecting cable and a selected number of flashbulbs.

According to the invention there is employed an illuminating reflector composed of two halves that fold together, and which when folded has the general configuration of a rectangular box. The size of the reflector parts are large enough to accommodate a battery casing lying within them, as folded, and which is thus enclosed as if in a case. In order to use the device, the reflector halves are opened and the battery casing is taken out. The electrical connecting cable is removed from a groove about the upper periphery of the battery casing and the reflector is placed upon it by seatng two holding notches formed in the reflector into the groove on the battery casing. The reflector is held securely thereon through the pressure of a spiral spring.

The battery casing is similar in rating and configuration to the known units but somewhat smaller in size. It carries the known lamp battery of 4.5 volts which may in known manner be introduced and removed from below through a hinged closable lid. In its upper part an insulating plate carries a socket mounting for the usual vacuum flash bulb. All of the known type vacuum flash cables can be soldered or clamped with the positive conductor at the exterior of the bulb socket and the negative conductor alongside at the battery casing.

Upon one side of the bottom lid of the casing a known type channeled shoe or female clamp is arranged, whereby the illuminating unit may be affixed to every camera which has a cooperating foot or male projection.

One feature of the instant invention is the continuation of the reflector engaging groove about the entire upper periphery of the battery casing whereby there is provided seating means for the reflector which permits mounting of the reflector on either side of the battery casing. This latter feature makes it possible to assemble the illuminating unit with the camera engaging channeled shoe or female clamp on the left or right side thereof whereby the proper positioning of the illuminating unit with respect to the camera lens may be obtained as desired. With this structural innovation, the illuminating unit may be positioned directly over the camera body or to one side of it depending upon the lighting effect desired.

After use, the reflector is taken off the battery casing, the cable is rolled about the socket mounting and then the casing is placed within the reflector whereupon the two reflector halves close automatically through spring pressure. This provides a great advantage in that the entire unit is still somewhat smaller than a conventional pocket lamp (flash light), has no exteriorly hanging cable, and the camera engaging shoe or clamp is covered so that the exterior surfaces are smooth. As a result, the pocket illumnating unit may easily and conveniently be carried along in a coat pocket or in a lady's handbag.

Furthermore, an additional advantage is obtained in that the elements of the unit may be almost entirely constructed of punched and stamped sheet metal parts whereby the expense may be substantially lower than that of previously known units.

An embodiment of the invention is shown in the drawing for purpose of illustration. The drawing shows:

Fig. 1 is a front elevation partially broken away view of an embodiment of this invention in its carrying condition;

Fig. 2 is a perspective view of the embodiment in Fig. 1 in an operative condition;

Fig. 3 is a cross-sectional plan view taken through the reflector portion of Fig. 2; and Fig. 4 is a cross-sectional view in elevation taken through Fig. 3 along the line 4—4 and looking in the direction of the arrows.

Reference will now be made to Figs. 1 through 4 in order to more particularly describe the invention. As shown in Figs. 2 and 3, the reflector of the illuminating unit is composed of two halves, 1a and 1b, which are swingably connected together as by hinges 2. The two halves are constantly resiliently biased together as by means of a spiral spring element 3 located adjacent the bottom edges of the reflector halves. The extended ends of this spring are retained in the respective reflector parts by means of eyelets as illustrated. Along the bottom edge surface of each reflector part, less than midway from the hinged sides, is positioned a cleft or notched indentation, 4a and 4b respectively, which is adapted to cooperate with the groove provided in the battery casing and retain the reflector securely thereon.

As shown, the reflector halves 1a and 1b are each shaped to have a dished or escalloped configuration and when closed, one upon the other, form a rectangular box-like enclosure.

The inner curved surfaces of the reflector halves 1a and 1b may be plated with a bright metallic film and polished to have a high gloss as is customary in the art.

A conventional type of battery casing is shown at 5 in the drawings and consists of a generally rectangular box having rounded corners so as to give it an ovated cylinder appearance (see Fig. 2). The casing includes a bottom cover member 13 which is hinged thereto by conventional means (not shown). A resilient snap element 14 is integrally connected (as by soldering, etc.) with the casing 5 adjacent its lower end and includes a dependent lip element (not shown) which is adapted to snap over the nether surface of cover member 13 when in closed position and positively retain the cover member in its battery retaining position. A channeled shoe or female clamp member 15 is integrally connected to the cover member as by bolting, soldering, etc., and is adapted to cooperate with a shoe or male clamp on a camera body to retain the illuminating unit fixedly mounted thereon.

The upper end of the battery casing is closed by an insulating member 7 which makes a sealed connection with the interior wall surface thereof. This end closure element is centrally perforated to permit the contact end of a conventional flash lamp or bulb to protrude therethrough into the interior of the casing. A lamp or bulb supporting socket 8 (of a conductive material) is positioned around the opening thus formed and is fixedly positioned on the member 7 as by crimping or riveting, etc. This socket is adapted to accommodate flash bulbs in the usual manner and may be provided with attachment inserts for fitting different sized bulbs as well as different types (bayonet or screw socketed). Adjacent one side of the central opening in member 7 and extending thereacross is positioned a resilient contact element 11. This element may be formed from any resilient conductive material and constitutes an elongated extension which may be connected thereto as by soldering, riveting, etc. Suitable precaution should be taken to prevent spring 11 from contacting the socket base 8 in order that the flash bulb will not be short circuited.

Immediately above the surface of the end closure member 7, the periphery of the casing 5 is slotted as at 6a and 6b to provide reflector retaining grooves on either side of the socket member 8. As shown in Fig. 1, these slots extend approximately half way in from each of the short sides of the casing 5 and form a convenient retaining space for accommodating the bottom edge surfaces of the reflector halves 1a and 1b. The notched portions 4a and 4b of the reflector halves are adapted to abut the inner edges of the adjacent grooves 6a and 6b and by means of the pressure from spiral spring 3 to retain the reflector securely latched onto the casing.

An electrical connecting cable 9 is positioned adjacent the base portion of socket 8 and according to conventional design includes positive and negative leads in an enclosing sheath, one end of each of which is connected by soldering or disconnectable clip means to the socket base 8 and the battery casing 5 respectively. The other respective ends of the leads terminate in a known type socket unit for connection with the camera shutter mechanism on the camera body.

A second spring contact element 12 is soldered or riveted, etc., to the interior wall of casing 5 adjacent the closure member 7 and is adapted to cooperate with the elements previously described as hereinafter explained.

In operation, a battery 10, indicated in dashed lines in Fig. 1, is inserted into the casing 5 where its respective negative and positive terminals contact the respective spring elements 11 and 12. It will thus be apparent that an electrical circuit is provided via the spring 12, the casing 5 and one lead of the cable 9, and also via the spring 11, the flash bulb (shown in Figs. 2 and 4), the socket member 8, and the other lead of cable 9, to the socket connection with the camera shutter mechanism, where in conventional manner, the circuit may be energized via a switch synchronized with the shutter movement.

The provision of the deep slots 6a and 6b makes it possible to mount the reflector on either broad side of the battery casing, i. e., in a position wherein the face of the reflector faces opposite from that shown in Fig. 2, whereby the battery casing may be shifted on the camera body to position the bulb either closer to or farther away from the lens, via the mounting clamp 15.

In practice it may be desirable to design the reflector as being slightly longer than necessary so as to provide space for accommodating a flash bulb mounted in socket 8 as well as several bulbs within the space between the socket wall 8 and the side walls of casing 5. This type of construction renders it possible to carry all the necessary elements for taking pictures under illumination, other than the camera itself, in a single self-contained package which can be easily accommodated in conventional sized coat pockets and handbags.

The usual reflector cleaning cloth or tissue may be wrapped around the casing 5 and associated elements prior to enclosure within the reflector halves in order to prevent scratching or scarring of the reflector surface. In any event the battery casing and reflector are formed to have a relatively snug fit when in folded position in order to obviate this difficulty.

It will be apparent that the configuration illustrated for the split reflector unit is not controlling and that other and different shapes, such as partial hemispheres may be utilized.

As many apparently widely different embodiments of this invention may be made without departing from the spirit and scope hereof, it is to be understood that the above invention is not limited except as defined in the appended claims.

What is claimed is:

1. A photographic pocket flash unit comprising a battery casing and a reflector element, said reflector element including two vertically hinged halves of like concave configuration having bottom edges, spring means connected to each of said halves for urging said halves in a direction to form an enclosure therebetween, said battery casing being elongated in shape with ovate top and bottom portions, said casing and reflector halves being of such sizes and shapes as to allow said casing to be totally enclosed within said enclosure formed by said reflector halves, said top portion of said casing including socket means for operatively supporting a flash lamp, said casing including clamp means for mounting said unit upon a camera, said casing having elongated front and rear wall portions connected by oppositely disposed rounded end wall portions and a pair of oppositely disposed slots adjacent said top portion and extending inwardly toward the socket means from the end wall portions, said bottom edges of said reflector halves having notches adapted to engage said slots in order to mount said reflector halves at a predetermined angle behind a flash lamp supported upon said top portion of said casing, and said spring means urging said notches into engagement with said slots to securely mount said reflector upon said top portion of said casing.

2. A photographic pocket flash unit as set forth in claim 1 wherein said clamp means is positioned on one side of the bottom portion of said casing, said slots being engageable by said notches from both the front and rear of said casing to permit said reflector halves to be mounted either on the front or rear portion of said casing and adjacent the top portion thereof, thereby permitting optional positioning of said unit directly over the body of said camera or to one side of it.

References Cited in the file of this patent

UNITED STATES PATENTS

| | | |
|---|---|---|
| D. 153,555 | Ross | Apr. 26, 1949 |
| 866,268 | Edwards | Sept. 17, 1907 |
| 1,321,153 | Runnion | Nov. 11, 1919 |
| 1,370,842 | Reeves | Mar. 8, 1921 |
| 1,521,610 | Finesilver | Jan. 6, 1925 |
| 2,268,380 | Boesser | Dec. 30, 1941 |
| 2,615,120 | Macksoud | Oct. 21, 1952 |
| 2,715,675 | Macksoud | Aug. 16, 1955 |

OTHER REFERENCES

Page 283 of a catalogue of L and C Mayers C., 5th Ave., New York City, 1942.